United States Patent [19]
Chenoweth et al.

[11] Patent Number: 4,948,409
[45] Date of Patent: Aug. 14, 1990

[54] MULTIPLE SEGMENT SPINNER

[75] Inventors: Vaughn C. Chenoweth, Coldwater, Mich.; Doyle Gieselman, Munster, Ind.; Vernon L. Wainwright, Albion, Mich.

[73] Assignee: Guardian Industries Corp., Northville, Mich.

[21] Appl. No.: 395,509

[22] Filed: Aug. 18, 1989

[51] Int. Cl.$^5$ ..................... C03B 37/04; C03B 37/095
[52] U.S. Cl. ............................................ 65/15; 65/14; 65/172; 65/173; 425/8
[58] Field of Search ..................... 65/6, 8, 14, 15, 172, 65/173, 374.12; 425/8; 264/8

[56] References Cited

U.S. PATENT DOCUMENTS

| | | | |
|---|---|---|---|
| 2,994,915 | 8/1961 | Duncan | 65/14 |
| 3,048,885 | 8/1962 | Firnhaber | 65/14 X |
| 3,048,886 | 8/1962 | Firnhaber et al. | 65/14 X |
| 3,245,768 | 4/1966 | Simmers | 65/14 X |
| 3,372,013 | 3/1968 | Porter | 65/15 |
| 3,928,009 | 12/1975 | Perry | 65/14 |
| 3,984,240 | 10/1976 | Costin | 75/171 |
| 4,203,746 | 5/1980 | Battigelli et al. | 65/6 |
| 4,203,939 | 5/1980 | Drachenberg et al. | 264/130 |
| 4,248,577 | 2/1981 | Bory et al. | 425/131.5 |
| 4,511,383 | 4/1985 | Bhatti | 65/6 |
| 4,622,054 | 11/1986 | Huey et al. | 65/2 |
| 4,767,432 | 8/1988 | Gaul | 65/8 |

FOREIGN PATENT DOCUMENTS 2609708 7/1988 France ................................ 65/15

Primary Examiner—Robert L. Lindsay
Attorney, Agent, or Firm—Shlesinger & Myers

[57] ABSTRACT

A multiple segment glass fiberizing spinner and method of making same provides a product of low cost and improved service life. The spinner comprises a plurality of, preferably four, segments of a cast alloy having a large number of small radially oriented apertures disposed about its periphery. Each segment is preferably investment cast. After casting, the segments may be trued if necessary by heating and forming. The segments are then weighed and same-weight segments are welded end-to-end to form a hoop or annulus. Next, a larger plurality of small bores are formed in the sidewall of the spinner. Finally, an optional bottom disc is secured to the segmented annulus, preferably by welding.

3 Claims, 4 Drawing Sheets

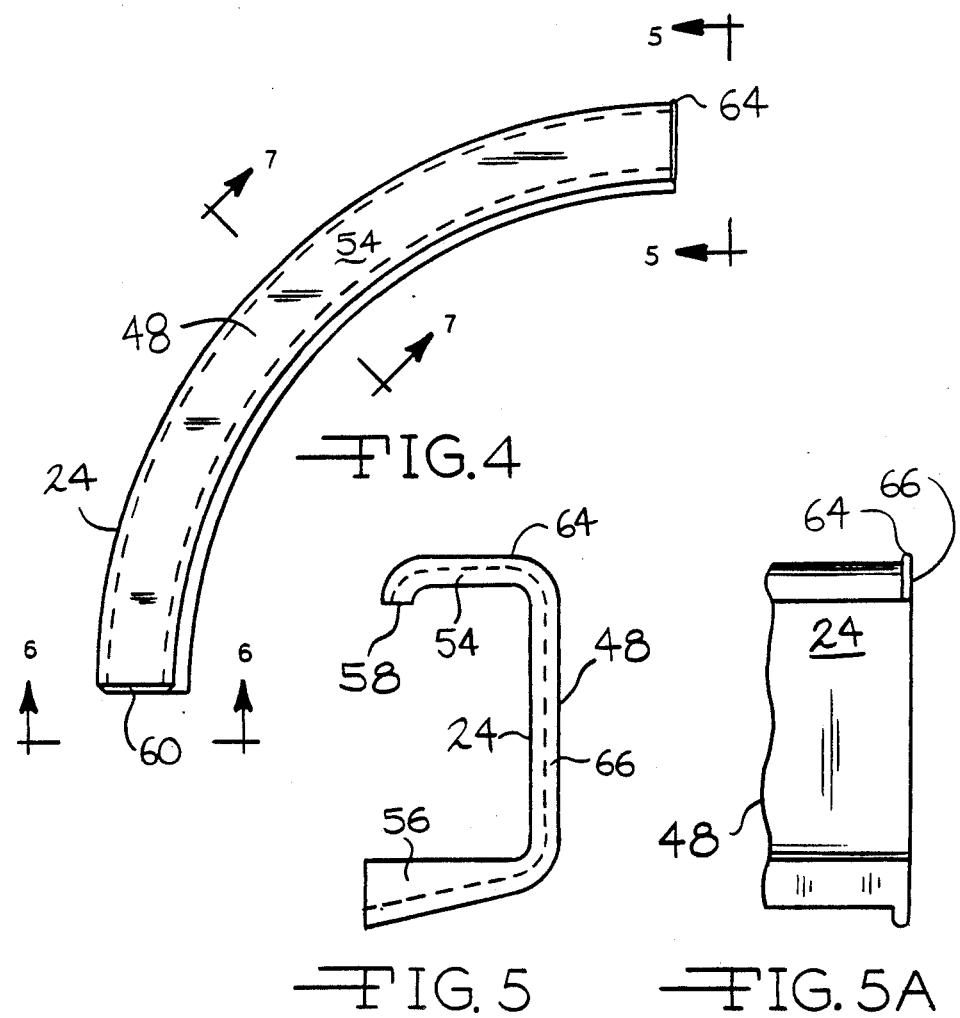
FIG. 4
FIG. 5
FIG. 5A
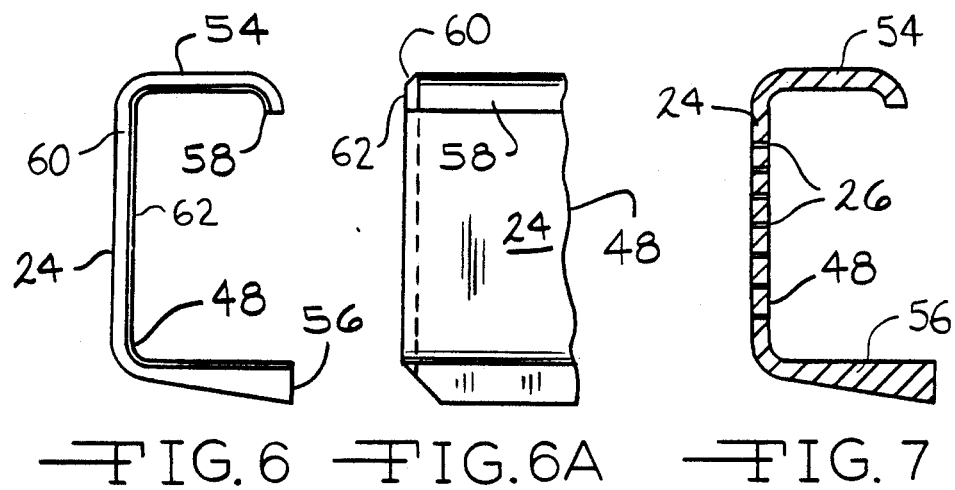
FIG. 6
FIG. 6A
FIG. 7

MULTIPLE SEGMENT SPINNER

BACKGROUND OF THE INVENTION

The invention relates generally to fiberizing spinners and more particularly to a spinner and method of making same, which is assembled from a plurality of peripheral segments and a bottom plate.

The fiberization of glass is typically accomplished by providing a centrifugal spinner and supplying it with a vertically descending stream of molten glass from a forehearth. The spinner is typically supported and rotated on a vertical axis, and the stream of molten glass is fed into the interior and flows to the inner surface of a vertically oriented peripheral wall. The wall defines a large plurality, typically many thousands of, orifices through which the molten glass is centrifugally forced, thereby forming a like plurality of glass streams or fibers external to the spinner. A continuous annular flow of gas, frequently at an elevated temperature, encases the spinner and flows axially downwardly about the periphery of the spinner. The fibers of glass are attenuated by the gas flow. A binder is generally also applied to the glass fibers to improve their adhesion to one another. Finally, the glass fibers are collected upon a foraminous conveyor.

As those familiar with the glass fiberizing process appreciate, the process is, for all intents and purposes, a continuous rather than a batch process. For example, the glass supplied by the forehearth is supplied continuously. Likewise, and desirably, the spinner is constantly rotated, the hot gas for attenuation is provided continuously, and the collection process, typically occurring on a moving conveyor, is also continuous. Often the one feature which interrupts this virtually continuous production process relates to the fiberizing spinner, and more specifically the service life of the fiberizing spinner.

Such spinners operate near the temperature of the molten glass, generally in the range of 1800° to 2000° F. or higher. While these temperatures are substantially below the melting points of the metals and alloys used in such applications, the devices are subject to severe service life constraints.

For example, the elevated operating temperatures and high centrifugal forces to which the periphery of the spinner is subjected create significant difficulties associated with the slow deformation, i.e. creep, of the spinner walls. Eventually this action results in stress-rupture failure of the spinner. Furthermore, the molten glass operates to erode the metal and enlarges the orifices of the spinner as it flows therethrough. If this action goes uncompensated, the fiber size increases throughout the life of a given spinner. The fiber size can be adjusted to compensate for orifice diameter change, but eventually sufficient compensation will be unattainable. The elevated operating temperature of the spinner also results in corrosion of the metal by atmospheric agents. The net result of these factors, all operating to deteriorate the spinner, is that the typical service life of a production spinner may be only several hours. When a spinner fails or becomes unserviceable, the production line must be temporarily halted and the spinner replaced. Obviously, a spinner exhibiting improved service life is highly desirable.

Other factors point to the need for improved spinner technology. For example, the vast number of orifices or apertures in a spinner, typically counted in the tens of thousands, are presently most efficiently provided by non-mechanical drilling means such as laser or electron beam drilling. Such drilling processes, while rapid and efficient, are limited by their ability to produce orifices only when properly focused on an object. If the object is nominally circular, such as a fiberizing spinner, but exhibits radial or diametral runout, the drilling beam will lose focus, and thus drilling ability at certain portions of the periphery, and either poorly drill the orifices or completely fail to drill them. Thus, it is essential that the spinner exhibit good circularity in order to ensure the rapid and efficient drilling of the thousands of orifices in the sidewall of the spinner. In the past, this problem has been solved by machining the periphery of the spinner to achieve accurate circularity. This machining step increases the cost of the spinner, and is therefore undesirable. A spinner configuration exhibiting improved circularity, which accordingly eliminates such a machining step, is thus desirable.

Another difficulty of current spinner configurations which results from present production methods is also aggravated by their operating parameters. Because a spinner is rotated at relatively high speeds, typically between 1500 and 2500 rpm., it is essential that the spinner be well balanced. A spinner which is even only slightly out of balance is, ideally, discarded even before it is used, because of its harmful effect on production equipment and its significantly reduced service life. This situation mandates balancing of each individual spinner on equipment which may require significant operator attention, depending on the equipment utilized. A rotor configuration which is the product of improved manufacturing and assembly steps, which eliminate the need for balancing, is thus also highly desirable.

SUMMARY OF THE INVENTION

The present invention relates to a multiple segment fiberizing spinner and method of making the same. The spinner comprises at least two, and preferably a plurality of three, four, five or more, peripheral segments cast from a high temperature alloy. Where N equals the number of segments in a spinner, each segment extends along 360/N degrees of the spinner. Each spinner segment is generally C-shaped in cross section. After casting, the segments may be trued, if necessary, by reheating and forming over a curved form. The segments are then weighed and selected by weight similarity for assembly into a spinner. The segments are then welded end-to-end into an annulus. A pattern of thousands of orifices or apertures are formed in the sidewall of the spinner by laser or electron beam drilling or other suitable mechanical or non-mechanical means. Finally, and optionally, a circular bottom plate is secured to the segments, either by weldment or fasteners.

Thus, it is an object of the present invention to provide a multiple segment fiberizing spinner exhibiting improved service life and operating characteristics.

It is a further object of the present invention to provide a multiple segment glass fiberizing spinner of N segments wherein each segment subtends 360/N of the spinner.

It is a still further object of the present invention to provide a multiple segment spinner which eliminates the need for balancing each spinner.

It is still a further object of the present invention to provide a multiple segment spinner which is composed of a cobalt 31 based alloy.

It is a still further object of the present invention to provide a method of fabricating an improved multiple segment glass fiberizing spinner.

Further objects and advantages of the present invention will become apparent by reference to the following description of the preferred embodiment and appended drawings.

BRIEF DESCRIPTION OF THE DRAWINGS

FIG. 4 is a top plan view of a segment of a glass fiberizing spinner having four segments, according to the present invention.

FIG. 5 is an end elevational view of a glass fiberizing spinner, according to the present invention, taken along line 5—5 of FIG. 4.

FIG. 5A is a side elevational view of the end of the glass fiberizing spinner, illustrated in FIG. 5.

FIG. 6 is an end elevational view of a glass fiberizing spinner, according to the present invention, taken along line 6—6 of FIG. 4.

FIG. 6A is a side elevational view of the end of the glass spinner, illustrated in FIG. 6.

FIG. 7 is a full sectional view of a glass fiberizing spinner, according to the present invention, taken along line 7—7 of FIG. 4.

DETAILED DESCRIPTION OF THE INVENTION

Figure 12:
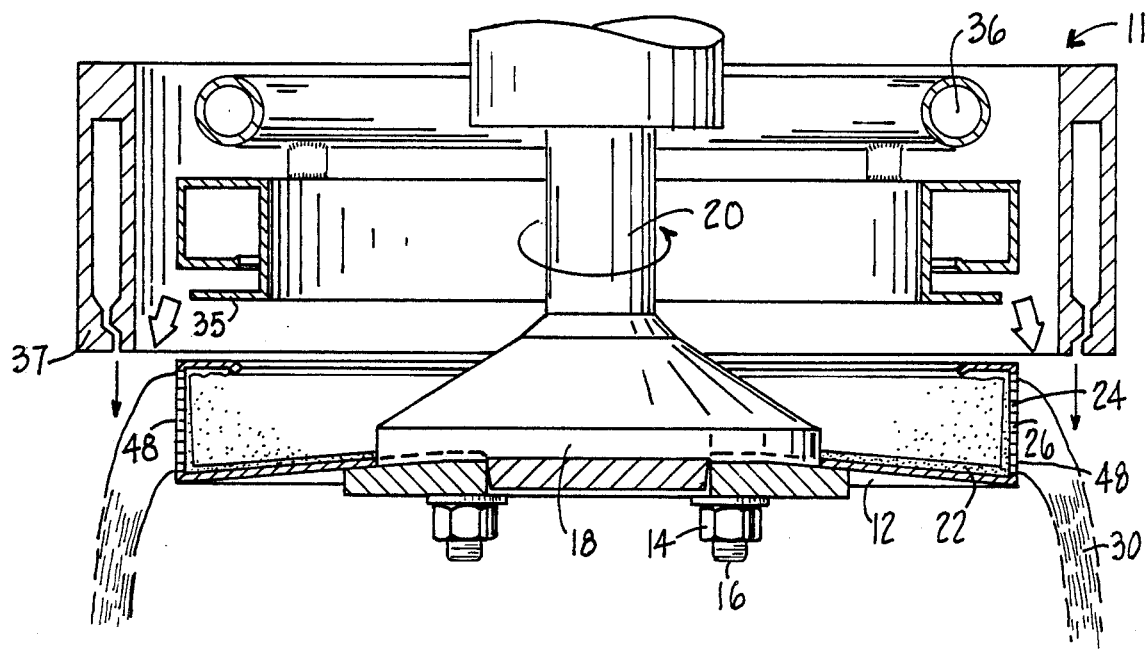
FIG. 12 is a diagrammatic sectional view of a rotary glass fiber-forming apparatus, including a glass fiberizing spinner, according to the present invention.

Referring now to FIG. 12, a rotary glass fiberizing assembly including multiple segment spinner 12, according to the present invention, is diagrammatically illustrated and generally designated by reference numeral 11, representing the best mode for carrying out the present invention. Rotary fiberizing assembly 11 includes a multiple segment spinner 12, which is secured by a plurality of threaded fasteners 14 received on a like plurality of complementarily threaded studs 16. Threaded studs 16 extend axially from a central hub 18. Central hub 18 is the terminus of a rotating shaft 20. Rotating shaft 20, and thus hub 18 and spinner 12, are driven by a prime mover (not illustrated) and rotate at speeds between 1500 and 2500 rpm.

Spinner 12 is provided with a center drop flow of molten glass 22 from a forehearth (not illustrated). Rotation of spinner 12 causes molten glass 22 to move radially outwardly and distribute itself along the interior surface of sidewall 24 via centrifugal force. Sidewall 24 defines a large number of minute orifices 26, and molten glass 22 flows therethrough driven by centrifugal force. A large number of glass fibers 30 thus issues from spinner 12, and specifically orfices 26, and moves radially outwardly and axially downwardly from spinner 12. Manifold 35 is supplied with natural gas from delivery unit 36, and produces a soft indolent flame that impinges upon the spinner wall and keeps the fibers sufficiently viscous, so that staple fibers are formed by viscous separation, once the fibers encounter the continuous downward curtain of cool air issuing from air blaster 37 that directs the fibers to a collection mechanism (not shown). Binders and other resin may be applied to glass fiber 30 by spraying equipment (not illustrated). Finally, the fibers may be collected on a moving conveyor (not illustrated).

Figure 1:
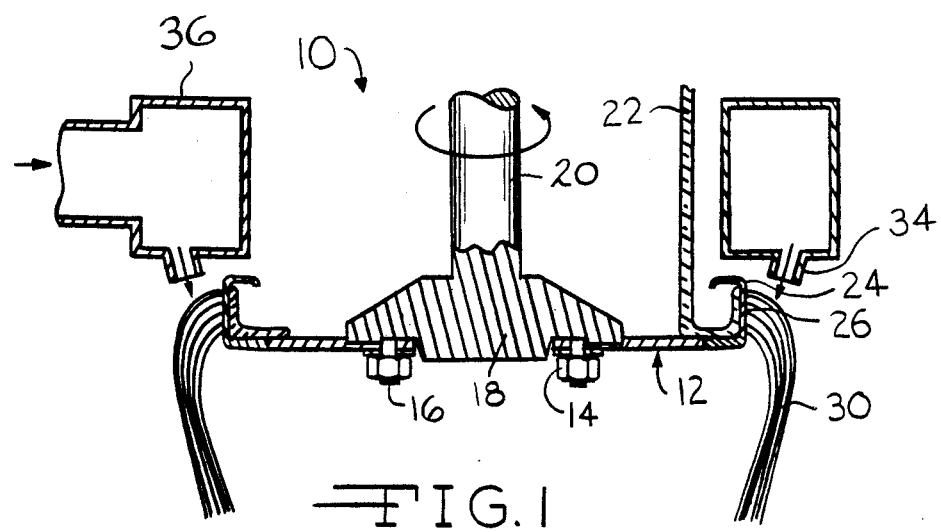
FIG. 1 is a diagrammatic, full sectional view of a typical rotary glass fiber forming apparatus, but with a fiberizing spinner according to the present invention.

Multi-segment spinner 12 is not limited in its use to fiberizing assembly 11, illustrated in FIG. 12. Spinner 12 can be efficiently utilized in many different fiberizing systems. For example, rotary glass fiberizing assembly 10 illustrated in FIG. 1, including multisegment spinner 12, is typical of glass fiberizing equipment, utilizing the prior art process called hot gas blast. Other configurations, including both minor and significant variations, which nonetheless have as their purpose the fiberizing of glass, are known. However, it will be appreciated, first of all, that assemblies 10 and 11 as illustrated in FIGS. 1 and 12, respectively, are representative of such equipment and, secondly, that the present invention will find broad application in other glass fiberizing configurations. It will also be appreciated that spinner 12 performs a very important function in fiberizing assemblies 10 and 11.

Unfortunately, and as noted above, whereas other processes associated with the glass fiber forming process, such as glass melting, fiber forming, collecting and trimming, are continuous, the short service life of spinner 12, often counted in mere hours, interrupts the continuous process and reduces production throughput. The multiple segment glass fiber forming spinner 12, according to the present invention, provides improved service life relative to prior spinner designs and thus improves production throughput and reduces downtime.

Figure 2:
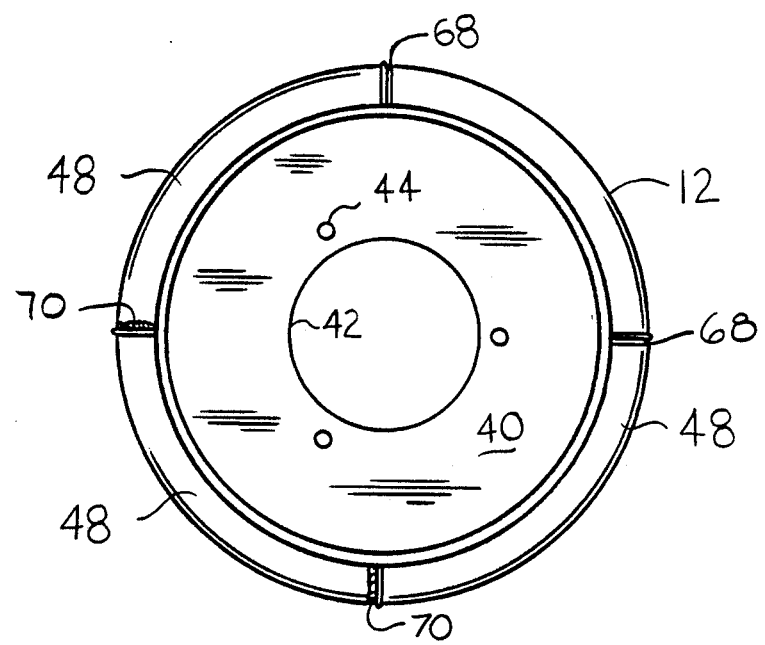
FIG. 2 is a top plan view of a glass fiberizing spinner, according to the present invention.
Figure 3:
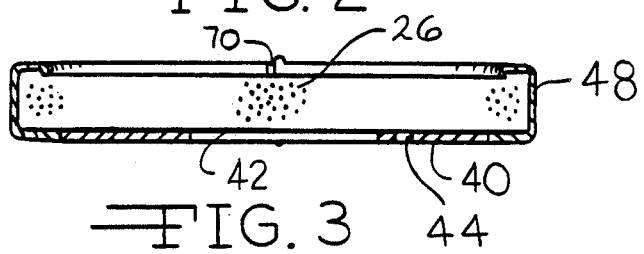
FIG. 3 is a full sectional view of a glass fiberizing spinner, according to the present invention.
Figure 8:
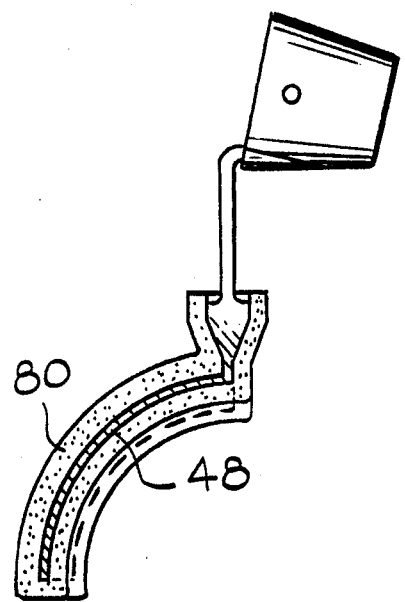
FIG. 8 is a diagrammatic full sectional view of an investment mold for casting a glass fiberizing spinner, according to the present invention.

Referring now to FIGS. 2 and 3, spinner 12 preferably includes a bottom closure plate 40 having a centrally disposed aperture 42 and a plurality of concentrically disposed, equally spaced-apart smaller apertures 44 which receive threaded studs 16 (illustrated in FIG. 1) extending from central hub 18. Inasmuch as a particular mounting arrangement is dictated by the equipment to which spinner 12 is secured, it will be appreciated that other mounting arrangements, such as a single center aperture without adjacent smaller apertures, may be utilized. Similarly, centrally disposed aperture 42 may be larger or smaller than illustrated in FIG. 2. Bottom plate 40 may also be omitted as discussed below.

Spinner 12 also includes a plurality of sidewall segments 48 which define the periphery of spinner 12. The number of sidewall segments 48 in a given configuration of spinner 12 may be varied between a minimum of two through a maximum of eight or more. Where N equals the number of segments 48, each segment 48 will extend along 360/N degrees of a circle. For example, in spinner 12 illustrated in FIG. 2, having four segments 48, each segment 48 extends along an arc of 360/4 or 90 degrees.

As will be more fully appreciated subsequently, one of the primary features of spinner 12, according to the present invention, is the utilization of a plurality of sidewall segments 48, each individual segment 48 of which represents but a portion of the total sidewall 24. Segments 48 are thus easier to fabricate and handle and, if defective, represent a smaller loss if discarded. Opposed to these considerations is the fact that an increased number of segments 48 increases the assembly time, and thus cost, of spinner 12. Hence, while as few as two segments 48, each extending around 180° of spinner 12, or three, five, six, eight or more segments, each extending along 120°, 72°, 60° or 45°, respectively, may be utilized, the use of four segments 48, each extending around 90°, i.e. a quadrant of a circle, has been found to be an optimum compromise of the factors discussed directly above.

Bottom plate 40, if utilized, is preferably fabricated of a stainless steel such as stainless steel 304 or a material having similar structural and thermal characteristics, such as resistance to creep, thermal expansion, melting point, and the like. Sidewall segments 48 are preferably investment cast from alloys intended for glass/refractory service, such as cobaltchromium-nickel alloys and the like. Numerous diverse and well-known alloys perform well when utilized in spinner 12, according to the present invention. The preferred alloy for composition of spinner segments 48 of the instant invention is a cobalt 31 based alloy consisting essentially of the following:

| Element | Percent Composition |
|---|---|
| C | .45 to .55 |
| Mn | 1.00 |
| Si | 1.00 |
| Cr | 32 to 36 (preferably 32 to 34) |
| Ni | 9.5 to 11.4 |
| Mo | .50 |
| W | 7.0 to 8.0 |
| Co | BALANCE |
| Fe | 2.0 |

Spinner 12 is also capable of being constructed of sheet metal fabricated from wrought alloys, such as HS150, to further reduce the cost of producing spinner 12.

In its preferred mode, spinner 12 is designed to rotate in the range of 1900–2300 RPM, preferably at about 2000 RPM, and have an outer diameter of 15 inches. Spinner 12 is also designed to preferably operate with an air blaster pressure of 20–25 psi, and a pull rate of 800–1300 lb/hr/spinner, preferably about 1225 lb/hr/spinner. The spinner life at 1225 lb/hr, and a spinner temperature of about 1900° F of a sheet metal spinner fabricated from an HS150 wrought alloy, is about 9 hours, while the life of a cast segmented spinner under the same conditions is about 21 hours.

Referring now to FIGS. 4, 5, 5A, 6, 6A and 7, an individual spinner segment 48 subtending an angle of approximately 90°, which will be utilized with three additional segments 48 to form a complete circle or hoop, is illustrated. Spinner segment 48 is generally C-shaped in cross-section, as is well illustrated in FIGS. 5 through 7, and generally defines sidewall 24 and a pair of axially spaced-apart upper and lower walls 54 and 56, respectively. Lower wall 56 of spinner 12 can also be angled to induce molton glass flow to peripheral wall of spinner 12, as shown in FIG. 12. The inner edge of upper wall 54 terminates in a curved, overhanging lip 58. In sidewall 24, the plurality of radially oriented apertures 26 provide communication from the interior of spinner 12 to the exterior as noted above. Sidewall 24 and upper wall 54 are generally equal and constant in thickness, whereas lower wall 56 preferably increases in thickness at increasing distances from sidewall 24.

The relative radial dimensions of lower wall 56 and of bottom plate 40 may also be adjusted widely, as desired. That is, the radial width of lower wall 56 may be extended inwardly beyond that illustrated in the drawing figures and the radial width of bottom plate 40 may be correspondingly reduced. With certain mounting configurations, for example, a mounting structure having a larger diameter than central hub 18 illustrated in FIG. 1, it will be possible to eliminate bottom plate 40 altogether.

At one end of each of spinner segments 48, chamfered face 60 extends from lip 58 along upper wall 54, sidewall 24, and lower wall 56, as illustrated in FIGS. 6 and 6A. At the same end of segment 48, adjacent chamfered face 60, is a narrow end face 62, coextensive and adjacent chamfered face 60. At the opposite end of segment 48 is disposed an outwardly extending lip or bead 64, as illustrated in FIGS. 5 and 5A. Bead 64 extends from lip 58 along upper wall 54, sidewall 24, and lower wall 56. At the same end of segment 48, adjacent bead 64, is flat end face 66. When segments 48 of multiple segment spinner 12 are disposed in circular juxtaposition, end face 62 of one segment 48 is placed in abutting contact with flat end face 66 of an adjacent segment 48. Tapering cavity 68 (illustrated in FIG. 2) is thus formed which extends from lip 58 along upper wall 54, sidewall 26 and lower wall 56, as will be readily understood. Tapering cavity 68 may be filled with weldment 70, two of which welds are illustrated in FIG. 2, to secure adjacent segments 48 of multiple segment spinner 12 together.

Figure 9:
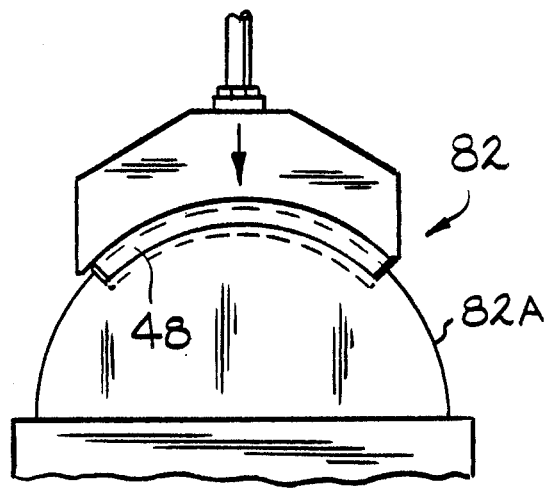
FIG. 9 is a diagrammatic side elevational view of an apparatus for truing glass fiberizing spinners, according to the present invention.

As to construction of spinner 12, the method is illustrated in FIGS. 8 through 11. Each of segments 48 is individually investment cast in mold 80. Whether each segment 48 subtends 60°, 72°, 90°, 120°, or some other angle, it will be appreciated that by casting segments smaller than a complete, 360° circle, the accuracy, not only from a dimensional and circularity standpoint, but also from a density standpoint, is improved. An added benefit is, of course, that if a given segment 48 is defective, it may be discarded without the greater loss attendant a larger piece, such as a complete spinner. After casting, if segment 48 is found to be slightly noncircular, it may be reheated and formed between the curved surfaces of hydraulic press 82 or on a suitable curved form or jig 82A, as shown in FIG. 9. This postcasting truing is a significant benefit of spinner segment 48, according to the present invention, over a spinner cast as a single piece, since once the singlepiece spinner is cast, reforming or truing the spinner is extremely difficult, as will be readily appreciated.

Before assembly, each individual segment 48 is weighed and the weight noted. Segments 48, having the same weight, or within a given relatively narrow weight range (tolerance), are then utilized to assemble spinner 12.

Figure 10:
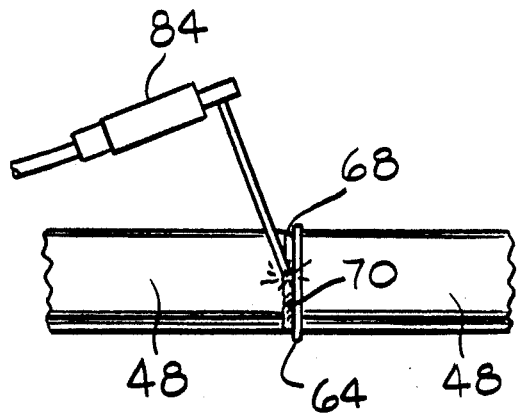
FIG. 10 is a side elevational view of a glass fiberizing spinner, according to the present invention, illustrating welding of the segments.

The requisite number of weighed segments 48 are assembled into a hoop or full annulus, as illustrated in FIG. 2, and cavities 68 are filled with weldment 70 by, for example, arc welding components 84 as shown in FIG. 10, in accordance with conventional practice.

Figure 11:
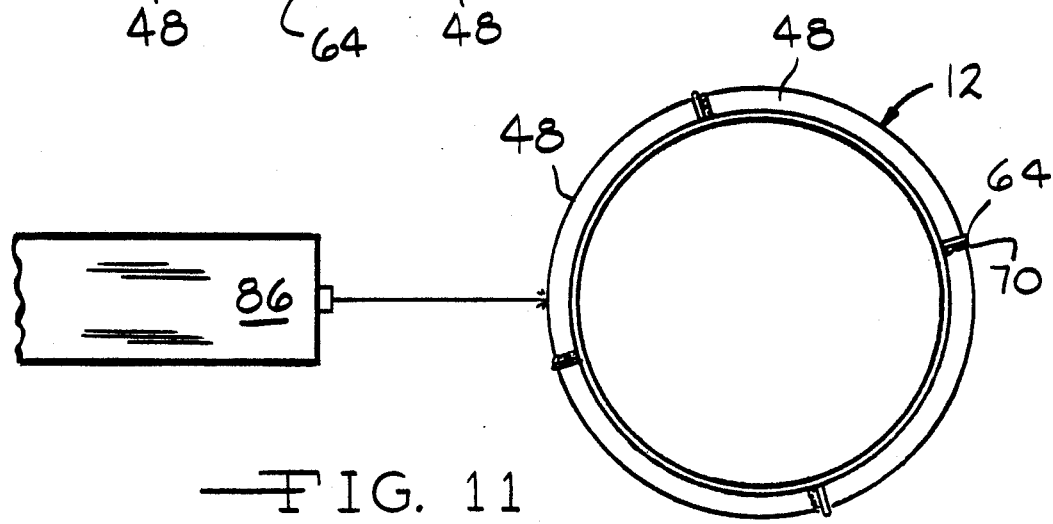
FIG. 11 is a side elevational view of a laser drilling apparatus forming apertures in the sidewall of the glass fiberizing spinner, according to the present invention.

Next, as shown in FIG. 11, apertures 26 are formed in sidewall 24 by laser or electron beam drilling equipment 86. As noted, the improved circularity of multiple segment spinner assembly 12, fabricated according to the instant invention, improves the quality of apertures 26, fabricated by such means as laser drilling, since accurate focus of the laser beam is essential to achieving accurate placement and size of apertures 26, and such is ensured by the improved circularity.

Finally, bottom plate 40, if utilized, can be welded into place about its periphery, which is in contact with or proximate the inner edge of bottom wall 56 of each segment 48.

It will be appreciated that fiberizing spinner 12, and the method of making same, provide spinner 12 with improved durability and performance characteristics. The extended service life results in reduced down-time and an improved, consistent product. While described generally within the context of glass fiber production, it should be understood that spinner 12, according to the present invention, will find application in other fiberizing equipment and arts, such as, for example, the production of synthetic polymer fibers.

The foregoing disclosure is the best mode devised by the inventors for practicing this invention. It is apparent, however, that apparatus and methods incorporating modifications and variations will be obvious to one skilled in the art of glass fiberizing spinners. Inasmuch as the foregoing disclosure is intended to enable one skilled in the pertinent art to practice the instant invention, it should not be construed to be limited thereby, but should be construed to include such aforementioned obvious variations and be limited only by the spirit and scope of the following claims.

We claim:

1. A disposable, substantially circular spinner of finite useful life comprised of an axially extending side wall having a plurality of discrete, defined holes therein through which fibers may be formed by centrifugal force by rotation of said spinner and having a cross-sectional configuration capable of containing molten fiberizable material therein such that all fibers formed must emanate from said discrete holes in said side wall, and wherein said spinner is formed of a plurality of segments extending axially to form said side wall of said circular spinner.

2. A spinner according to claim 1 wherein there are N number of said segments each being of substantially around 360/N degrees of said circular spinner.

3. A spinner according to claim 2 wherein said spinner includes a non-segmented bottom wall connected to said side wall, said bottom wall being comprised of a creep and thermal-resistant, stainless steel and said side wall being comprised of an alloy consisting essentially of by weight 32–36% chromium, 9.5 to 11.5% nickel, 7.0 to 8.0% tungsten, less than 2% iron and a balance of cobalt.

* * * * *

UNITED STATES PATENT AND TRADEMARK OFFICE
CERTIFICATE OF CORRECTION

PATENT NO. : 4,948,409
DATED : Aug. 14, 1990
INVENTOR(S) : Vaughn C. Chenoweth, Doyle Geiselman and Vernon L. Wainright It is certified that error appears in the above-identified patent and that said Letters Patent is hereby corrected as shown below:

On the title page, item [75],
    delete "Gieselman", the last name of the second listed inventor, and substitute --Geiselman--.

Column 1, line 16, delete "," (coma) after "of" and insert --,-- (coma) before "of".

Column 2, line 64, insert --°-- (degree symbol) after "360".

Column 4, line 9, delete "orfices" after "specifically" and substitute --orifices--.

Signed and Sealed this

Fourteenth Day of March, 2000

Attest:

Q. TODD DICKINSON

*Attesting Officer*      *Commissioner of Patents and Trademarks*